United States Patent [19]

Talan

[11] Patent Number: 4,633,071

[45] Date of Patent: Dec. 30, 1986

[54] METHOD AND APPARATUS FOR RAPID MANUAL TRANSFER OF DATA FROM STANDARDIZED FORMS

[76] Inventor: Jeffrey S. Talan, 325 W. 100th St., New York, N.Y. 10025

[21] Appl. No.: 621,058

[22] Filed: Jun. 15, 1984

[51] Int. Cl.[4] ............................................. G06K 19/00
[52] U.S. Cl. ..................................... 235/487; 235/495
[58] Field of Search ................................ 235/495, 487

[56] References Cited

U.S. PATENT DOCUMENTS 3,839,625 10/1974 Chadima ............................. 235/495
3,860,795 1/1975 Morrill ................................ 235/495

Primary Examiner—Harold I. Pitts

[57] ABSTRACT

A method and apparatus for highlighting and annotating data on preprinted or standardized forms to enable rapid data transferral, whereby the forms are aligned on an upright support and covered with a clear overlay, the location of specific data on the forms is indicated on the clear overlay by using an erasable or indelible marker and the information is then read from the form through the clear overlay. The apparatus for performing this method comprises means for supporting and aligning the preprinted or standardized forms in a stable position beneath a clear overlay and which allows removal of the forms from beneath the overlay one at a time.

7 Claims, 1 Drawing Figure

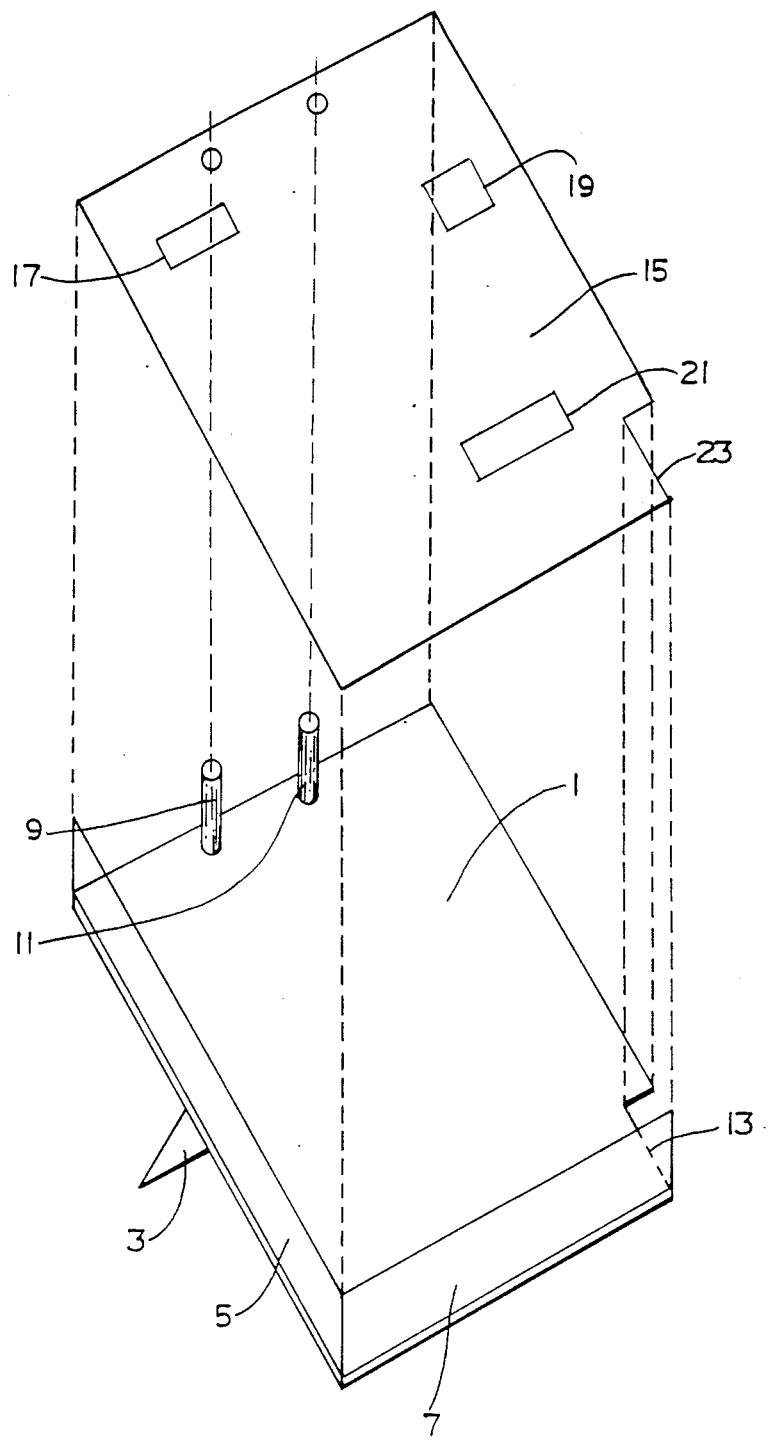

METHOD AND APPARATUS FOR RAPID MANUAL TRANSFER OF DATA FROM STANDARDIZED FORMS

BACKGROUND OF THE INVENTION

It is a common practice for organizations to collect data on various subjects using standardized or preprinted forms. The information sought to be collected is manually entered on these forms. The information contained on these standardized forms is then often entered into a computer for use in a data base or other application. Entry of this information into a computer is usually done by a typist who reads the information from the form and types it onto a computer terminal keyboard.

Often it is desirable to select only certain information from a standardized form for entry into a computer. It is also often desirable to enter the information from a standardized form into a computer either with changes in format (e.g. uniform abbreviations for words) or in a different order from that which it is recorded on the standardized form. In these cases the typist must carefully read the information from the form when entering it on the computer terminal keyboard, and/or consult a separate set of instructions for translation of the data prior to keyboard entry.

Template type methods and apparatuses for reading or entering data on standardized forms are known in the art. See, e.g. U.S. Pat. Nos. 3,610,893; 3,408,977; and the patents cited therein. Common disadvantages of all of the known apparatuses and methods are that they can only be used with one particular standardized form, i.e. they are not easily adaptable to use with a variety of forms, and that it is time-consuming to prepare new versions of the apparatuses for use with a variety of forms. A further disadvantage of some devices is that they are primarily suited for recording information rather than reading and transferring information from forms not expressly designed for computer data entry. The resulting problems of aligning standardized forms with the template, and reading information through apertures in opaque templates render other devices unacceptable for this use.

SUMMARY OF THE INVENTION

It is an object of the present invention to provide a method and apparatus which will aid the typist so that particular information can be derived from virtually any standardized form quickly with notes and/or instructions printed adjacent to each item from the standardized form to be typed, and in the proper order.

The present invention relates to a method and apparatus for quickly transferring data from preprinted or standardized forms.

The method involves first supplying a suitable support for a plurality of standardized forms such that the forms can be aligned and maintained in a stable position. Second, a sheet of clear material is attached to the support in such a way that the standardized forms will be held between the support and the clear sheet. Third, a marking pen is used to draw one or more boxes on the clear sheet in the position which corresponds to the information sought to be retrieved from the standardized form. An optional last step would be to make notations on the clear sheet adjacent to these boxes indicating instructions to the typist pertaining to the information to be entered, the order in which the information should be read, or similar notations. Once these preliminary steps have been completed, selected information can be quickly read from the topmost standardized form, the topmost standardized form can then be removed from the pile and the next standardized form will be in place for similar reading through the clear sheet so marked. The property of the template that renders it particularly suitable for this application is its transparency. Standardized forms are frequently completed in a careless, sloppy manner with strikeouts, corrections, etc. The clear template described here allows such markings to be read easily.

The design of the invention also facilitates quick replacement of one clear sheet with another for use with different types of standardized forms. This method is most suitably performed using the apparatus described in the attached drawing and the following detailed description.

BRIEF DESCRIPTION OF THE DRAWINGS

With these and other objects in view, which will become apparent in the following detailed description, the apparatus of the present invention, which is shown by example only, will be clearly understood in connection with the accompanying drawing, in which:

The single FIGURE is a perspective view of the apparatus of the claimed invention.

DETAILED DESCRIPTION OF THE DRAWING

The drawing shows an apparatus particularly suited for utilizing the method disclosed above. The apparatus is very similar in appearance to a normal typing stand insofar as it comprises a base 1 and a support 3. The base 1 is rectangular in shape and should be slightly larger than the size of the standardized forms to be used with this apparatus. Fixedly mounted on the left side of the base is an alignment edge 5 which extends at a right angle from the base for a length sufficient to accommodate a supply of standardized forms. On the bottom edge of base 1 is similarly attached another alignment edge 7. In the lower right hand corner of base 1 there is provided a notch 13. This notch allows the typist to remove preprinted or standardized forms from the pile of forms one at a time using the thumb and index finger of the right hand.

At the top of base 1 there are provided posts 9, 11 or similar anchoring means on which there is attached an overlay 15. The overlay 15 is composed of a clear material preferably a flexible clear plastic. In accordance with the method of this invention, box-like windows, for example, 17, 19 and 21 are drawn on the overlay 15 using an erasable or indelible marking pen. The positioning of these windows corresponds with the location of data on the standardized form which is desired to be transferred from the standardized form by a typist and entered into a computer via a keyboard. The overlay 15 is also provided with a notch 23 which corresponds in position to notch 13 on the base 1.

The invention allows for the typist to put as many windows and instructions as are necessary on the overlay and these may be erased and redrawn in order to satisfy changing needs regarding data retrieval from similar or various standardized forms. In addition the overlay may be easily removed from the base allowing for the preparation, storage, and reuse of many overlays with many types of standardized forms.

The apparatus of the invention also allows for handling a plurality of preprinted or standardized forms one stacked under the other such that the upper most form is covered by the clear sheet and once it is read can be removed from the apparatus thus displaying the next standardized form beneath the clear sheet.

Although the invention is described and illustrated with reference to a single embodiment thereof, it is to be expressly understood that it is in no way limited to the disclosure of such a preferred embodiment but is capable of numerous modifications within the scope of the appended claims.

I claim:

1. A method for transferring data from a plurality of preprinted or standardized forms comprising the steps of aligning the forms in a stack on a stable support, attaching a clear overlay to said support such that the forms reside between the support and the overlay, manually drawing a symbol or indication on the overlay in the position of the data to be transferred from the forms, identifying the location of data on the preprinted forms under the clear overlay, thereby retrieving or transferring the data and removing the forms one at a time without substantial movement of the overlay.

2. An apparatus for rapid transfer of data from a preprinted or standardized rectangular or square form comprising:

means for supporting a plurality of forms in an upright position, means for aligning edges of the forms in a stable position without requiring punched holes in said forms, a clear overlay operatively attached to said support means, and marking means for indicating on said clear overlay the position of specific data.

3. An apparatus as in claim 2 further comprising means for removing said forms one at a time from beneath said overlay without substantial movement of the overlay.

4. An apparatus as in claim 2 wherein said marking means is an eraseable marker.

5. An apparatus as in claim 3 wherein said means for removing said forms one at a time from beneath the overlay comprises a notch in the lower right corner of the base and overlay.

6. An apparatus as in claim 2 wherein said clear overlay is removably attached to said support means.

7. An apparatus as in claim 2 wherein said means for supporting the form comprises a plane rectangular surface and wherein said means for aligning the edges of the forms comprises an alignment edge which extends perpendicular to the means for supporting the forms.

* * * * *